US007216878B2

(12) United States Patent
Damon (10) Patent No.: US 7,216,878 B2
(45) Date of Patent: May 15, 2007

(54) STEERING COLUMN RETAINERS FOR CHILDREN'S RIDE-ON VEHICLES

(75) Inventor: Daniel J. Damon, South Wales, NY (US)

(73) Assignee: Mattel, Inc., El Segundo, CA (US)

( * ) Notice: Subject to any disclaimer, the term of this patent is extended or adjusted under 35 U.S.C. 154(b) by 102 days.

(21) Appl. No.: 10/684,009

(22) Filed: Oct. 10, 2003

(65) Prior Publication Data

US 2005/0077699 A1 Apr. 14, 2005

(51) Int. Cl.
*B60D 7/16* (2006.01)
*A63H 17/38* (2006.01)

(52) U.S. Cl. .............................. 280/93.511; 280/93.51; 446/468

(58) Field of Classification Search ............. 280/93.51, 280/93.502, 93.511, 263, 267, 269, 270, 279; 446/468
See application file for complete search history.

(56) References Cited

U.S. PATENT DOCUMENTS

| 1,175,312 | A |   | 3/1916  | Simpson ............... 280/47.34 |
| 1,764,730 | A | * | 6/1930  | Kraeft ................... 280/93.51 |
| 1,984,309 | A |   | 12/1934 | Klatt ..................... 280/87.01 |
| 2,036,813 | A |   | 4/1936  | Kraeft ........................ 280/828 |
| 2,172,811 | A | * | 9/1939  | Snell ........................... 280/828 |
| 2,505,057 | A | * | 4/1950  | Middler ....................... 280/267 |
| 2,647,343 | A | * | 8/1953  | Julio et al. ................. 446/450 |
| 2,660,448 | A | * | 11/1953 | Walters et al. ........... 280/87.01 |
| 3,051,501 | A | * | 8/1962  | Bunn ....................... 280/1.188 |
| 3,091,212 | A | * | 5/1963  | McCauley ................. 116/50 |
| 3,617,078 | A |   | 11/1971 | Valukonis ................. 403/341 |
| 3,782,221 | A |   | 1/1974  | Nalodka et al. ............. 74/586 |
| 4,043,685 | A |   | 8/1977  | Hyams ...................... 403/19 |
| 4,052,082 | A |   | 10/1977 | Jones et al. ............. 280/87.021 |
| 4,460,197 | A |   | 7/1984  | Rogers .................. 280/86.758 |
| 4,573,941 | A | * | 3/1986  | Holden et al. ............. 446/451 |
| 4,580,462 | A | * | 4/1986  | Rehlander ................... 74/497 |
| 4,896,899 | A | * | 1/1990  | Lawrence .................. 280/775 |

(Continued)

FOREIGN PATENT DOCUMENTS

DE 3528357 C1 * 12/1986

OTHER PUBLICATIONS

Lil Kawasaki® Owner's Manual with Assembly Instructions, Fisher-Price, Inc., 1996.

*Primary Examiner*—Lesley D. Morris
*Assistant Examiner*—Daniel Yeagley
(74) *Attorney, Agent, or Firm*—Kolisch Hartwell, P.C.

(57) ABSTRACT

A children's ride-on vehicle and a method of connecting a steering column to the vehicle. The vehicle includes a body and a plurality of wheels. The vehicle also includes a steering assembly configured to steer at least one steerable wheel. The steering assembly includes at least a steering mechanism, a steering column, and a linkage mechanism. The steering mechanism receives steering inputs from a child steering the vehicle. The steering column is coupled to the steering mechanism and includes a proximal portion and a shoulder extending transversely from the proximal portion. The linkage mechanism couples the steering column to the steerable wheel. The linkage mechanism includes a receiver structure configured to receive the steering column. The retainer mechanism may be configured to engage the shoulder so that movement of the steering column generally opposing the direction is restricted. Methods of connecting the steering column to the vehicle also are disclosed.

32 Claims, 3 Drawing Sheets

U.S. PATENT DOCUMENTS

| | | | |
|---|---|---|---|
| 4,898,493 A | 2/1990 | Blankenburg | 403/326 |
| 5,000,716 A | 3/1991 | Canavesi | 446/468 |
| 5,071,384 A | 12/1991 | Poulsen | 446/163 |
| 5,099,714 A | 3/1992 | Hutchison et al. | 74/422 |
| 5,136,893 A | 8/1992 | Wilhelmy | 74/473.29 |
| 5,829,772 A | 11/1998 | Jones | 280/234 |
| 5,947,739 A | 9/1999 | Lenihan | 434/29 |
| 5,947,795 A | 9/1999 | Cohen | 446/469 |
| 5,984,356 A * | 11/1999 | Uphaus | 280/781 |
| 6,155,833 A | 12/2000 | Lenihan | 434/29 |
| 6,408,967 B1 * | 6/2002 | Huntsberger et al. | 180/65.1 |
| 6,488,563 B1 | 12/2002 | Isaacson | 446/450 |
| 6,572,125 B2 | 6/2003 | Erickson et al. | 280/93.514 |

* cited by examiner

STEERING COLUMN RETAINERS FOR CHILDREN'S RIDE-ON VEHICLES

FIELD OF THE DISCLOSURE

The present disclosure relates to steering assemblies for children's ride-on vehicles and to children's ride-on vehicles containing the same. More specifically, the disclosure relates to retainer mechanisms for restricting uncoupling of a steering column from a steering assembly of a children's ride-on vehicle.

BACKGROUND OF THE DISCLOSURE

Children's ride-on vehicles are reduced-scale vehicles sized and configured to be operated by children. The vehicles may be motorized vehicles, which may be powered by one or more battery-powered motors. Alternatively, the vehicles may be manually powered vehicles, which may be pedal-powered or powered by a child (or an accompanying adult) pushing the child's (or the adult's) feet against a ground surface. A ride-on vehicle is steered by a child operating the vehicle's steering assembly through movement of a handlebar, steering wheel, or other steering mechanism. Movements of the steering mechanism are conveyed as steering inputs through a steering column to one or more of the vehicle's wheels.

The steering column is typically an elongate shaft. The shaft couples the steering mechanism to a linkage assembly that conveys steering inputs to one or more steerable wheels. The shaft may be received in an opening in the linkage assembly so that rotation of the shaft is transmitted through the linkage assembly to the wheels, thereby producing a corresponding re-orientation of the wheels. To restrict removal of the shaft from the opening, an end of the shaft is typically retained with a cap nut, or PAL NUT™, which is a mechanical retainer that is installed by hammering the cap nut onto the end of the shaft. Installation of the cap nut is often performed by the consumer, often an adult, during final assembly of the ride-on vehicle.

Cap nuts and other conventional steering column retainers require tools to be installed, regardless of whether they are installed by the manufacturer or by a consumer. For example, cap nuts need to be hammered onto the end of the steering columns, and lock rings need to be forced around the end of the steering column and thereafter urged along the column. This tool requirement provides a potential for misinstallation, especially should the recommended tools or installation procedures not be utilized. A related consideration is whether the retainers provide a visual indication that they have been installed properly.

SUMMARY OF THE DISCLOSURE

A children's ride-on vehicle is provided. The vehicle includes a body and a plurality of wheels that are coupled rotatably to the body, at least one of which may be a steerable wheel. The vehicle also includes a steering assembly that is coupled to the body and configured to steer the steerable wheel. The steering assembly includes a steering mechanism, a steering column, and a linkage mechanism. The steering mechanism is configured to interface with a child steering the vehicle. The steering column is coupled to the steering mechanism and includes a proximal portion and a shoulder extending transversely from the proximal portion. The linkage mechanism may couple the steering column to at least one steerable wheel. The linkage mechanism includes a receiver structure configured to receive the steering column. The retainer mechanism is configured to engage the shoulder so that removal of the steering column is restricted. In some embodiments, the retainer mechanism is configured to be assembled manually, without the use of tools. In some embodiments, the linkage mechanism includes a spanning member that extends transversely to the proximal portion of the steering column. In some embodiments, the spanning member defines opposing first and second flanking spatial regions, with the steering column configured to be received by the receiver structure from the first flanking spatial region and the retainer mechanism positioning a retainer surface in the first flanking spatial region to restrict removal of the steering column from the receiver structure. Methods of connecting the steering column to a children's ride-on vehicle also are disclosed.

DETAILED DESCRIPTION AND BEST MODE OF THE DISCLOSURE

A children's ride-on vehicle having a retainer mechanism that is adapted to couple a steering column to a steering assembly of the vehicle is described. Methods for coupling the steering column to the steering assembly also are described. The retainer mechanism may be configured to engage an intermediate segment rather than a terminus of the steering column, to couple the steering column to a linkage mechanism of the steering assembly. For example, a retainer surface of the retainer mechanism may be disposed above a transversely extending shoulder of the steering column, to engage the shoulder and restrict its movement. In some embodiments, the retainer mechanism may be formed by retainer elements that are assembled around the shoulder. One of the retainer elements may be provided by a spanning member of the linkage assembly. In some embodiments, the retainer mechanism may be adapted to be assembled manually, without the use of tools. For example, the retainer mechanism may be adapted to be secured with a snap-fit mechanism. The retainer mechanism is preferably adapted to provide a visual, and optionally an audible, indication that the mechanism is installed properly. The retainer mechanism disclosed herein may be easier to install and less prone to misinstallation or failure than other retainer mechanisms for children's ride-on vehicles.

Figures 1, 2:
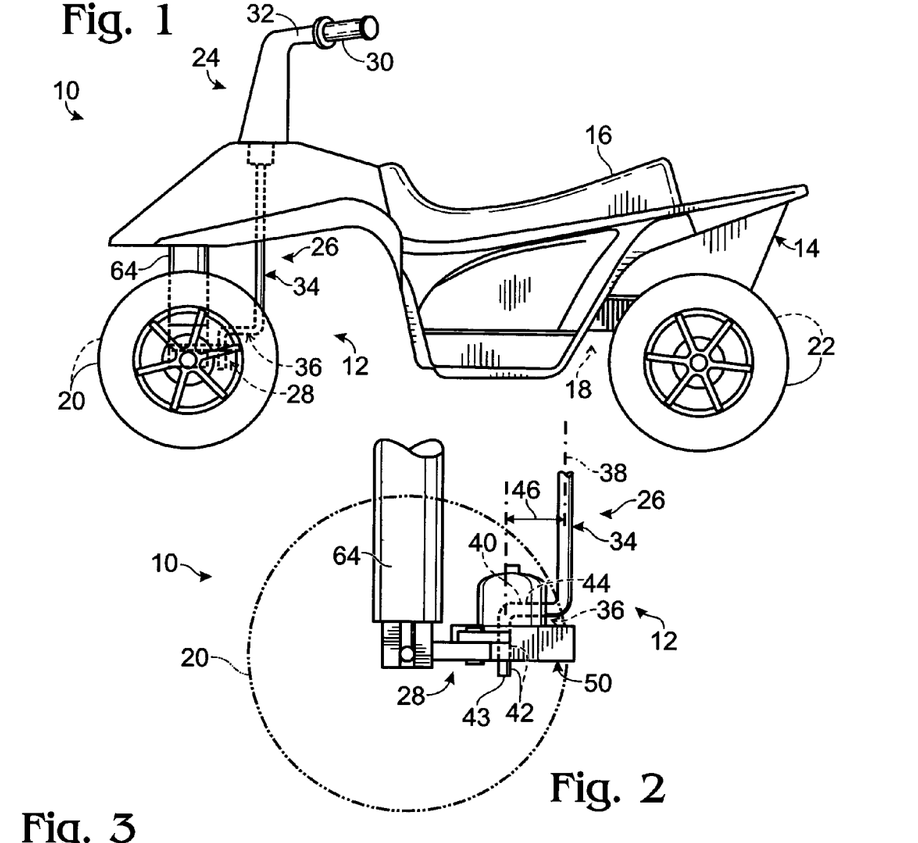
FIG. 1 is a side elevation view of a children's ride-on vehicle, constructed in accordance with aspects of the invention.
FIG. 2 is a fragmentary side elevation view of selected portions of a steering assembly included in the children's ride-on vehicle of FIG. 1.

FIG. 1 shows a children's ride-on vehicle 10 including a steering assembly 12 constructed in accordance with aspects of the invention. Vehicle 10 includes a body 14 having a seat 16 for supporting a child rider. The vehicle also includes a plurality of wheels that are coupled by any suitable mechanism for rotational movement relative to the body. Body 14 is typically a reduced-scale body that is sized to be operated by a child sitting on the seat. Body 14 may have any suitable shape, such as to resemble a full-sized adult vehicle or a fantasy vehicle that does not have a full-sized counterpart. The body and the seat may be formed of any suitable material including plastic, metal, wood, and/or the like, and may be formed unitarily or as discrete components.

The vehicle includes a drive assembly 18 to propel the vehicle. Drive assembly 18 may include pedals that are coupled to at least one of the plurality of wheels so that the wheels are rotatably driven as a child seated on seat 16 reciprocates the pedals. An illustrative example of a suitable pedal assembly is disclosed in U.S. patent application Ser. No. 10/004,503, the complete disclosure of which is hereby incorporated by reference for all purposes. Another suitable drive assembly 18 is a drive assembly that includes a battery-powered motor assembly that is adapted to drive the rotation of at least one of the plurality of wheels. Illustrative examples of children's ride-on vehicles with drive assemblies that include battery-powered motor assemblies are disclosed in U.S. patent application Ser. Nos. 10/081,934 and 09/665,195, the complete disclosures of which are hereby incorporated by reference for all purposes. Alternatively, the vehicle may be formed without a drive assembly and therefore may be adapted to be propelled by a child seated on seat 16 pushing the vehicle with the child's feet in a foot-to-floor manner, or by an adult who pushes the vehicle through any suitable mechanism.

In the present illustration, vehicle 10 includes two front wheels 20 and two back wheels 22. It is within the scope of the present disclosure that the vehicle may include any number of wheels, with children's ride-on vehicles typically including at least two or three wheels. One or more of the wheels may be adapted to be steered by steering assembly 12 and therefore may be referred to as steerable wheels. Steerable wheels, as used herein, are any wheels that have an angular disposition responsive to operation of the steering assembly. Here, both front wheels 20 are steerable wheels that are coupled to steering assembly 12. Similarly, wheels that are adapted to be rotationally driven by drive assembly 18 (when present) may be referred to as driven wheels. A wheel may be (but is not required to be) both driven and steerable.

Steering assembly 12 includes a steering mechanism 24 that is coupled, through a steering column 26, to a linkage mechanism 28. Steering mechanism 24 may be any structure that interfaces with the body of a person, that is, a child rider, to receive steering inputs from the child. The steering mechanism may include a handle portion 30 that is configured to be engaged by a person's hand. Accordingly, the steering mechanism may include handlebars 32 or a steering wheel, amongst others.

Steering column 26 includes any suitable structure that is configured to couple movement of the steering and linkage mechanisms. Accordingly, the steering column may have any suitable size and shape to perform its intended function. The steering column may be configured as a shaft, and typically an elongate shaft, that extends from the steering mechanism to the linkage mechanism. The steering column, or a distal portion thereof, may have a circular cross-section or any other suitable cross-section. The cross section may be fixed or variable along the length of the steering column.

Steering column 26 includes a proximal portion 34 and a distal portion 36. For example, proximal portion 34 may be an upper and/or major portion of the steering column and may be coupled to steering mechanism 24. As illustrated in FIG. 2, the proximal portion defines a long axis 38 about which the steering mechanism rotates. Long axis 38 may be disposed vertically or nonvertically, for example, extending at a forward angle from steering mechanism 24 generally toward the front of the vehicle. As illustrated, distal portion 36 is a lower and/or minor portion of the steering column and is coupled to linkage mechanism 28. Steering column 26 may be formed of any suitable material, including a metal alloy (such as stainless steel or an aluminum alloy), and/or a polymer, among others.

FIG. 2 shows a fragmentary side elevation view of selected portions of steering assembly 12. Front wheels 20 are shown in phantom outline to simplify the presentation. Some or all of portion 36 may be displaced from long axis 38, such as displacement asymmetrically to one side of the long axis. For example, the steering column may bend distally to define a shoulder 40 that extends transversely from proximal portion 34 (and long axis 38). The steering column also may bend distal to the shoulder to create a distal segment 42 terminating in a distal end 43. Accordingly, shoulder 40 may be an intermediate segment of the steering column, disposed proximal to distal segment 42, and may include an engagement surface 44 to resist uncoupling from linkage mechanism 28, as described in more detail below. In some embodiments, distal segment 42 may extend at least substantially parallel to long axis 38 of the steering column. Alternatively, distal segment 42 may be nonparallel to long axis 38. Distal segment 42 may be offset from the long axis of the steering column by a radius, shown at 46 (also see FIG. 3). In some embodiments, distal end 43 may be exposed or uncovered, that is, free of covering components.

Figure 3:
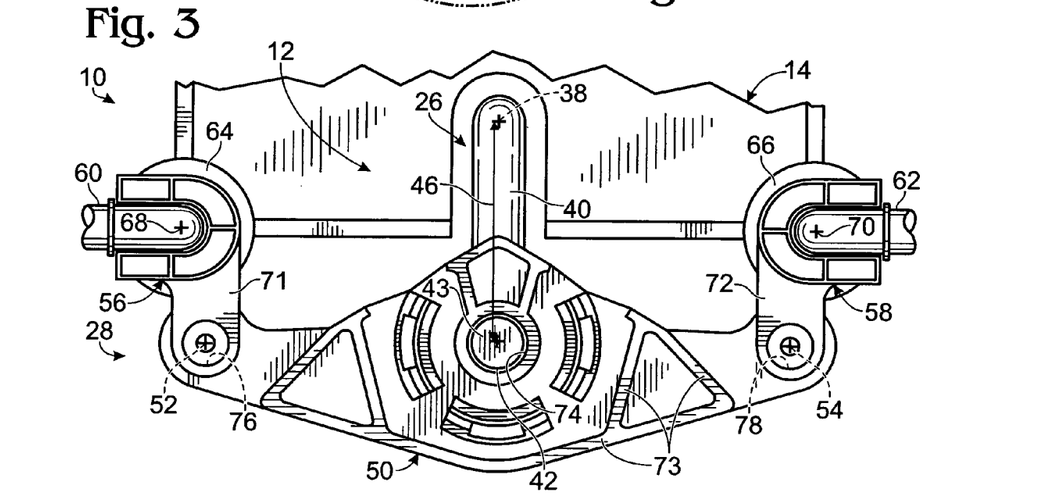
FIG. 3 is a fragmentary bottom plan view of a front portion of the vehicle of FIG. 1, illustrating aspects of the vehicle's steering assembly.

FIG. 3 shows a bottom view of a front portion of vehicle 10, including aspects of steering assembly 12, particularly linkage mechanism 28 and steering column 26. The linkage mechanism is adapted to couple rotation of the steering column to changes in the orientation of one or more steerable wheels. In the illustrated embodiment, linkage mechanism 28 includes a spanning member 50 that is coupled pivotably, at pivot sites 52, 54, to a plurality of axle assemblies 56, 58. Each axle assembly includes an axle 60, 62 upon which the steerable wheels respectively rotate (also see FIG. 1). Although not required, in the illustrated embodiment, the axle assemblies are coupled pivotably to body 14 through frame legs 64, 66, to define a pivot axis for each axle assembly, shown at 68, 70. Lever arms 71, 72 of the axle assemblies couple side-to-side (and/or arcuate) movement of the spanning member to rotation of the axle assemblies about pivot axes 68, 70.

Spanning member 50 may be any structure configured to couple rotational movement of the steering column to pivotal movement of axles 60, 62. Accordingly, the spanning member may couple rotation of the steering column to re-orientation of one, or more typically, a plurality of coupled, steerable wheels. The spanning member may extend transversely or at least substantially perpendicularly to the steering column, that is, the spanning member may define a long axis that is transverse or at least substantially perpendicular to long axis 38 of the steering column.

The spanning member may have any suitable shape and size to perform its intended function. Accordingly, the spanning member may be straight, bent, or curved, amongst others. In addition, the spanning member may be formed of any suitable material, including plastic, wood, metal, a combination thereof, etc. In some embodiments, the spanning member may be a linear bar, and may be formed of metal. In the present illustration, spanning member 50 may be formed from molded plastic, such as polypropylene, or any other suitable material and may include optional ribs 73. The ribs extend generally orthogonal from a plane defined by the spanning member, and may improve the strength and/or rigidity of the spanning member. Ribs 73 may be disposed on one side or on opposing sides of the spanning member. The spanning member may be formed as a single piece or may include two or more pieces that are connected to one another.

Spanning member 50 or another component of the linkage assembly may be described as defining a receiver structure and/or openings. For example, spanning member 50 may define a receiver structure 74 that receives distal portion 36 of the steering column, particularly a portion of distal segment 42. The receiver structure may be an opening (such as a through-hole, a cavity, a passage, etc.), an array of projections, etc. Receiver structure 74 may be disposed centrally in the spanning member, in relation to the long axis of the spanning member, and may be sized to have a diameter that is larger than that of distal segment 42 of the steering column, to allow the distal segment to pivot and/or travel axially in receiver structure 74. Spanning member 50 also may define laterally disposed openings 76, 78 adjacent an end or opposing ends of the spanning member. Lateral openings 76, 78 may be configured to couple to axle assemblies 56, 58, such as illustrated in FIG. 3.

Steering inputs may be transmitted from steering column 26, through linkage mechanism 28, to steerable wheels 20 as follows. Rotational movement of steering mechanism 24 relative to the body of the vehicle rotates steering column 26 about its long axis 38. This rotation moves distal segment 42 of the steering column, and spanning member 50, along an arcuate path to travel a lateral distance. The size of offset radius 46 of the steering column determines or otherwise contributes to the lateral distance traveled by distal segment 42 and spanning member 50 as the steering column rotates. Lateral/arcuate movement of the spanning member rotates axle assemblies 56, 58 about axes 68, 70.

A steering ratio may be defined by the offset of receiver structure 74 (and distal segment 42) from long axis 38 (that is, offset radius 46) divided by the length of lever arms 71, 72, as measured between respective pivot sites 52, 54 and pivot axes 68, 70. An offset radius equal to the length of the lever arms produces a steering ratio of 1.0. In the present illustration, offset radius 46 is greater than the lengths of the lever arms, to produce more responsive steering with a steering ratio greater than 1, for example, about 1.5 to 1.75.

Figure 4:
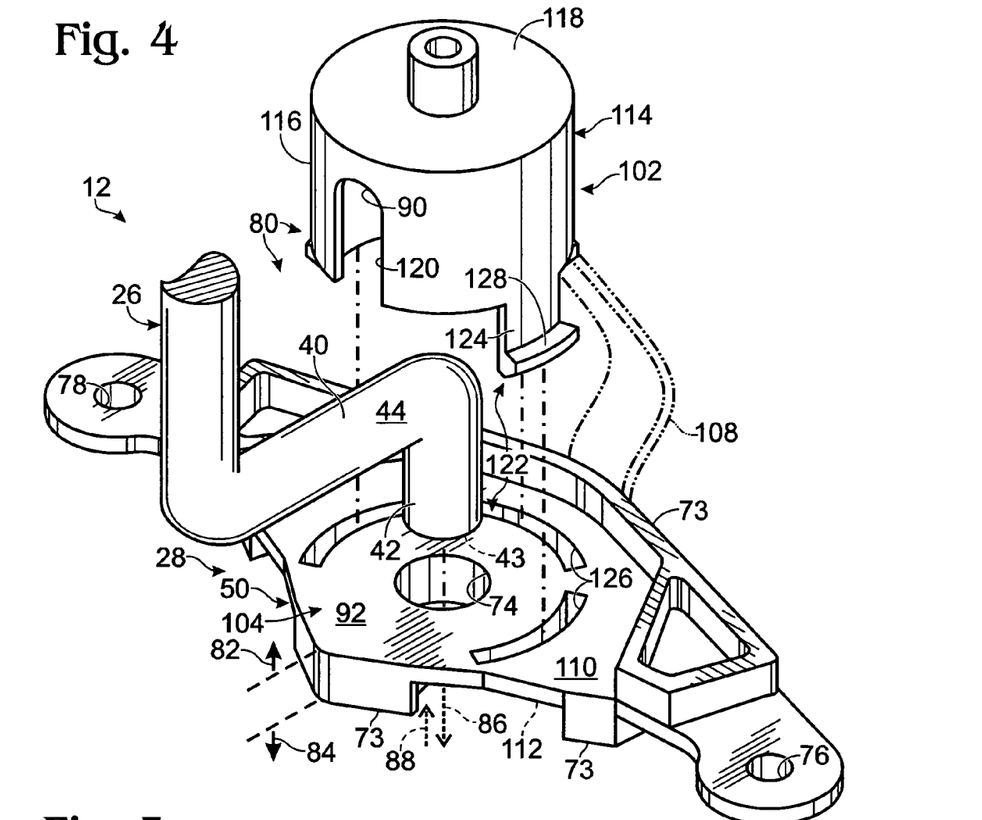
FIG. 4 is an exploded isometric view of selected portions of the steering assembly from the vehicle of FIG. 1, including an embodiment of a retainer mechanism that may be included in the steering assembly to restrict uncoupling of a steering column from the steering assembly.
Figure 5:
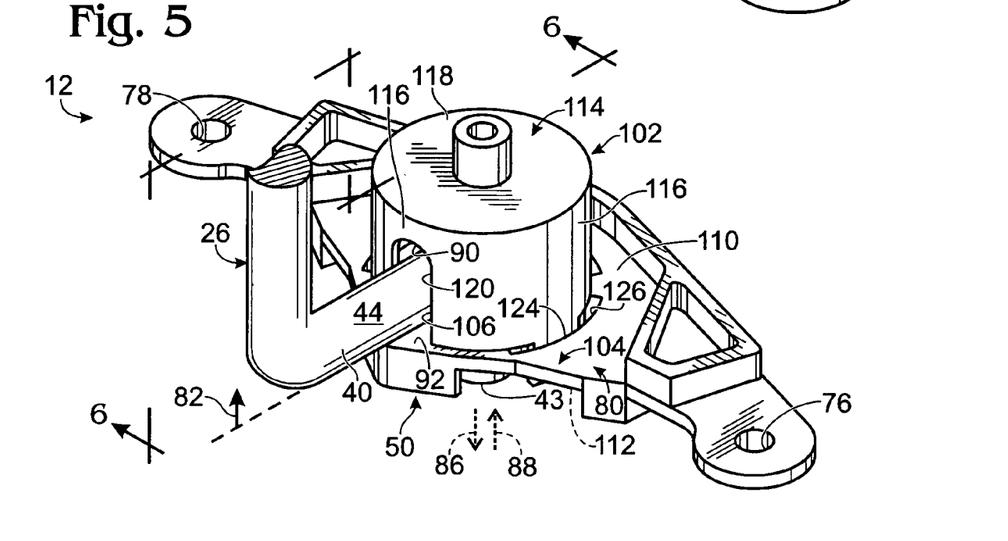
FIG. 5 is an assembled isometric view of the selected portions of the steering assembly of FIG. 4.

FIGS. 4 and 5 show exploded and assembled views, respectively, of a portion of steering assembly 12, particularly a retainer mechanism 80 that may be included in linkage mechanism 28 of the steering assembly. Retainer mechanism 80 is configured to restrict uncoupling of steering column 26 from linkage mechanism 28. The illustrated linkage mechanism, particularly spanning member 50, defines opposing spatial regions 82, 84 that flank the spanning member (and extend beyond the edges of the spanning member). The illustrated linkage mechanism is configured to receive the distal segment of steering column 26 from upper spatial region 82, from a direction 86. In some embodiments, the steering column may be received by receiver structure 74 from lower spatial region 84 (for example, see FIG. 7).

Retainer mechanism 80 provides a retainer surface that restricts movement (and uncoupling) of the steering column in a generally opposing direction 88. Retainer mechanism 80 also may restrict additional movement of the steering column in direction 86. For example, the retainer mechanism may be adapted to place retainer surfaces 90, 92 on opposing sides of shoulder 40, that is, in opposing spatial regions 94, 96 that flank engagement surface 44 of the shoulder. Upper retainer surface 90 may be disposed in upper spatial region 82, adjacent the spanning member, which may be the same spatial region from which the steering column is received by receiver 74 of spanning member 50. The retainer surfaces may be configured to engage the steering column in its resting position, for example, a position defined by gravity. Alternatively, or in addition, the retainer surfaces may be spaced from the steering column so that they engage the column in response to urging the steering column generally in direction 86 and/or opposing direction 88. Therefore, the retainer mechanism may restrict axial movement of the steering column, for example, generally upward and/or downward movement, in one direction or both opposing directions, amongst others.

Retainer surfaces 90, 92 of the retainer mechanism may be provided by two or more retainer elements, such as retainer elements 102, 104. The retainer mechanism also may include one or more additional retainer elements that facilitate assembly and/or positioning of the retainer mechanism (see below). The retainer elements may be configured to be assembled around the steering column to form a retaining passage 106 (see FIG. 5). Assembly of the retainer elements may actuate the retainer mechanism and may attach two or more of the retainer elements to one another. The steering column may extend through the retaining passage, so that shoulder 40 extends through passage 106, which may be defined partially by retainer surfaces 90, 92.

Retainer elements 102, 104 may have any suitable form and relationship to one another and other components of the linkage mechanism. The retainer elements may be formed and/or provided as separate components. Alternatively, the retainer elements may be formed unitarily as a single piece, for example, connected through a flexible connector 108, shown as part of an alternative embodiment in phantom outline in FIG. 4.

Retainer element 104 may be provided by spanning member 50. The spanning member may define first and second opposing surfaces 110, 112. First opposing surface 110 may face generally upward and second opposing surface 112 generally downward. When the first and second retainer elements are assembled, retainer surface 90 of the first retainer element may be disposed closer to upper surface 110 of the spanning member (than lower surface 112), and distal end 43 of the steering column may be disposed closer to lower surface 112 of the spanning member (than upper surface 110).

First retainer element 102 may be configured as a cap 114. The cap may at least substantially enclose part of the steering column in cooperation with second retainer element 104. In the illustrated example, cap 114 includes side walls 116 and a top wall 118. Side walls 116 may define an opening 120 that partially forms retaining passage 106 when the cap is assembled with second retainer element 104. Opening 120 may have a height that is greater than the diameter of shoulder 40, to permit some vertical movement of the shoulder. For example, the long axis of the steering column may be disposed nonvertically, so that rotation of the steering column causes the shoulder and distal segment of the steering column to follow a non-horizontal path. Top wall 118 may provide structural support, and may be omitted in some embodiments. Although illustrated as a substantially closed structure, cap 114 also may include a frame-like configuration.

First and second retainer elements 102, 104 may be configured to be assembled manually, without the use of tools. The retainer elements may to be urged together, for example, translationally, so that a fastener mechanism 122 is engaged (see FIGS. 4 and 6). In some embodiments, the fastener mechanism may be configured to produce an audible signal, such as a snap, when engaged.

The fastener mechanism may include one or more tabs 124 configured to be received in one or more slots 126. In the present illustration, cap 114 provides a plurality of tabs 124 having lateral flanges 128, and spanning member 50 defines a plurality of arcuate slots 126 configured to be aligned with the tabs. As shown, the tabs are radially spaced from each other around the steering column. However, any suitable complementary shapes and orientation of tabs and slots may be used. The perimeter of the slots may be defined distally by lips 132 of spanning member 50 (see FIG. 6). The lips may be disposed so that the slots taper distally and may be somewhat resilient, so that flanges 128 can be forced (preferably manually and without requiring the use of tools) through the slots to reach the opposing surface of the slots. The flanges also may be tapered or wedged to facilitate placing them through the slots. The slots may be wider than the tabs, so that cap 114 can rotate somewhat relative to spanning member 50, to accommodate pivotal movement of distal segment 42 in receiver structure 74 as the steering column is rotated. Alternatively, or in addition, opening 120 of cap 114 may be wider than the diameter of shoulder 40 to accommodate lateral movement of the shoulder as distal segment 42 pivots in receiver structure 74.

Figure 6:
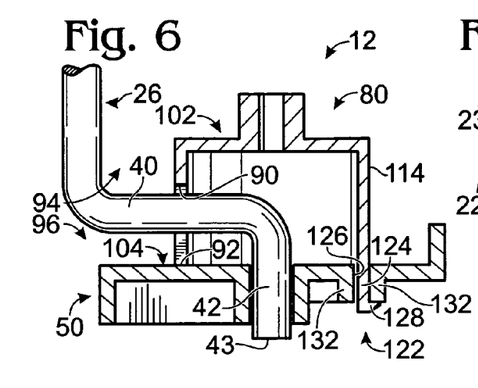
FIG. 6 is a sectional view of the selected portions of the steering assembly of FIG. 5, taken generally along line 6-6 of FIG. 5.

FIG. 6 shows a sectional view of a portion of steering assembly 12, particularly retainer mechanism 80 in an assembled configuration. As shown, shoulder 40 of the steering column is spaced from retainer surface 92 of the spanning member, for example, by restricting downward travel of the steering column at an opposing end of the column (for example, by attachment to the steering mechanism). Alternatively, shoulder 40 may rest on retainer surface 92. In the present illustration, upward movement of steering column 26 may be restricted by contact between retainer surface 90 of cap 114 and shoulder 40 of the steering column.

In FIG. 6, it can be seen that when the retainer mechanism is assembled, i.e. used to couple the steering column to the rest of the steering assembly, the protrusion of the tabs through the corresponding slots is visually discernable. Accordingly, with such a construction, the retainer mechanism may be described as providing a visual indication that the retainer mechanism is properly installed. The retainer mechanism may optionally be further configured to provide an audible indication, such as a click or similar sound, when the tabs are properly inserted through the slots. Neither the audible nor the visual indication is required. Retainer mechanisms that utilize the tab-and-slot construction described above may be referred to as being adapted to be coupled together with a snap-fit mechanism. As discussed, this mechanism is preferably adapted to be engaged manually by a user without requiring the use of tools.

Figure 7:
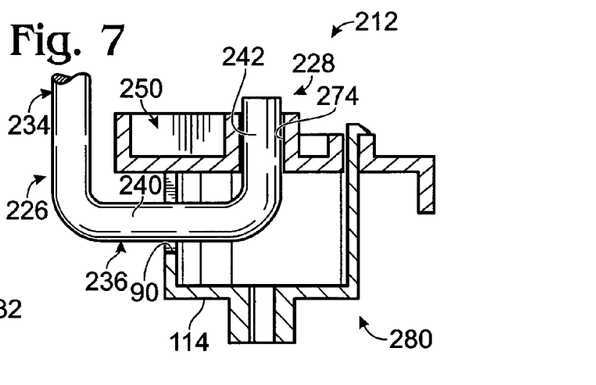
FIG. 7 is a sectional view of selected portions of another embodiment of a steering assembly that includes a retainer mechanism configured to restrict uncoupling of a steering column from the steering assembly, taken generally as in FIG. 6.

FIG. 7 shows a sectional view of a portion of another steering assembly 212 according to the present disclosure. As shown, steering assembly 212 includes a retainer mechanism 280. Steering assembly 212 illustrates a retainer mechanism that is adapted for use with a steering column 226 that is different from steering column 26 described above. As shown, steering column 226 includes a proximal portion 234 and a shoulder 240 that are similar to proximal portion 34 and shoulder 40 of steering column 26. However, distal segment 242 bends generally toward proximal portion 234 to form a U-shaped distal portion 236 of the steering column, rather than the generally Z-shaped distal portion 36 described above.

Steering assembly 212 includes a linkage assembly 228 having a spanning member 250 and a retainer mechanism 280. Spanning member 250 is configured to receive distal segment 242 in receiver 274 from below the spanning member. The retainer mechanism also may include cap 114 having retainer surface 90 positioned below the spanning member.

Figures 8, 9:
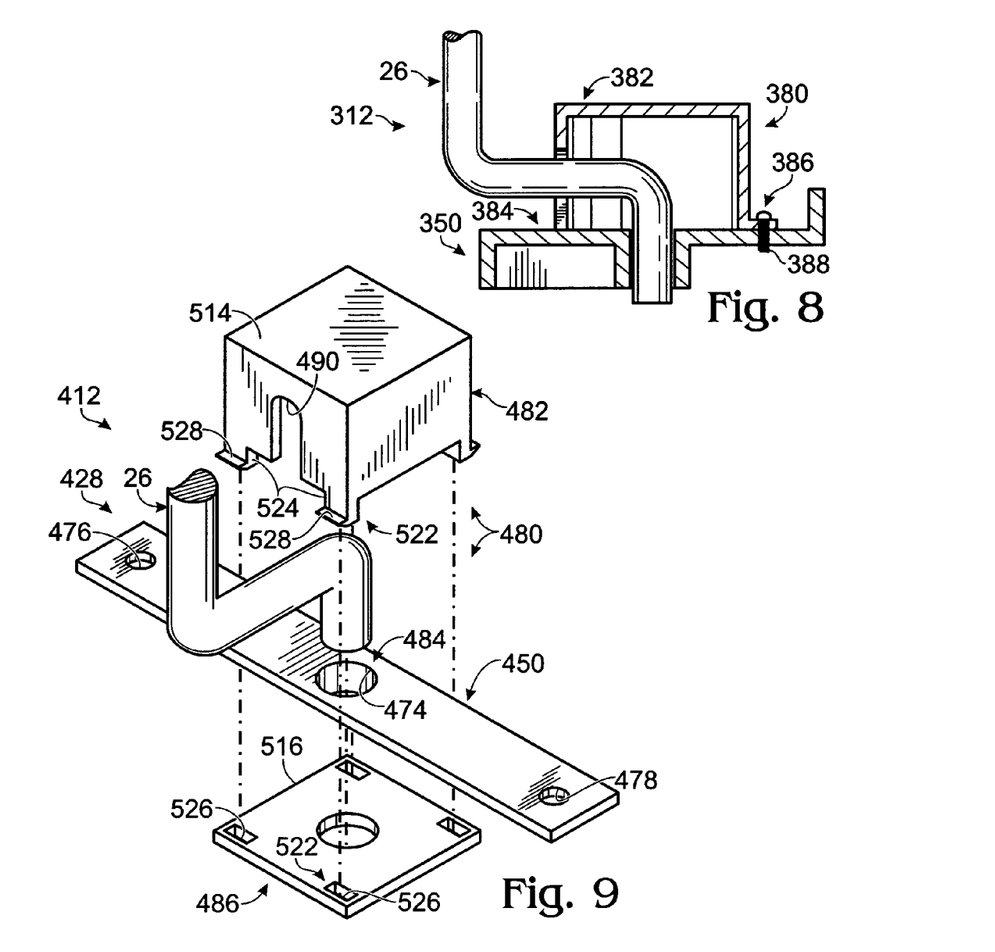
FIG. 8 is a sectional view of selected portions of another embodiment of a steering assembly that includes a retainer mechanism configured to restrict uncoupling of a steering column from a steering assembly, taken generally as in FIG. 6.
FIG. 9 is an exploded isometric view of selected portions of yet another embodiment of a steering assembly that includes a retainer mechanism configured to restrict uncoupling of a steering column from the steering assembly.

FIG. 8 shows a sectional view of a portion of another steering assembly 312. Steering assembly 312 includes a retainer mechanism 380 that is configured to restrict uncoupling of steering column 26 from the steering assembly. Retainer mechanism 380 includes retainer elements 382, 384. Retainer element 384 may be included in spanning member 350. The spanning member and retainer element 382 may be assembled using one or more fasteners 386, which take the form of a screw 388 in the present illustration. Other exemplary fasteners that may be suitable include clips, nuts and bolts, bendable wires/strips, etc.

FIG. 9 shows an exploded view of a portion of another steering assembly 412. Steering assembly 412 includes a linkage mechanism 428 having a retainer mechanism 480 configured to restrict uncoupling of steering column 26 from the steering assembly. Retainer mechanism 480 is an assembly formed by three or more retainer elements 482, 484, 486. Retainer element 484 may be provided by a spanning member 450. Spanning member 450 may be formed of metal or plastic, amongst others, and may define a receiver 474 and lateral openings 476, 478. Receiver 474 may correspond in function to receiver 74, and lateral openings 476, 478 to openings 76, 78 of spanning member 50 (see FIG. 4).

Retainer element 482 may be configured as a cap 514 and retainer element 486 as a plate 516. Retainer elements 482, 486 may be configured to be attached to one another around spanning member 450, to position a retainer surface 490 of cap 514 so that the surface restricts uncoupling of the steering column from the steering assembly, particularly linkage mechanism 428.

Retainer mechanism 480 may include a fastener mechanism 522 having tabs 524 that are received in slots or openings 526. Tabs 524 may include flanges 528 to restrict removal of the tabs, as described above for fastener mechanism 122. Alternatively, retainer mechanism 480 may be assembled using any other suitable attachment structures.

INDUSTRIAL APPLICABILITY

The retainer mechanisms disclosed herein are applicable to children's products, including children's ride-on vehicles and are applicable for securing the steering columns of such vehicle to the steering assemblies of the vehicles. The retainer mechanisms may be used to secure together and/or prevent removal of other portions of children's ride-on vehicles.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

I claim:

1. A children's ride-on vehicle, comprising:
a body;
a plurality of wheels mounted rotatably on the body and including at least one steerable wheel; and
a steering assembly coupled to the body and configured to steer the at least one steerable wheel, the steering assembly comprising:
a steering mechanism configured to interface with a child steering the vehicle,
a steering column coupled to the steering mechanism and including a proximal portion, a distal segment, and a shoulder extending generally transversely between the proximal portion and the distal segment, and
a linkage mechanism that couples movement of the steering column to a change in orientation of the steerable wheel through coupled motion of the steering column and the linkage mechanism, the linkage mechanism including a receiver structure configured to receive the distal segment of the steering column from a first direction and a retainer mechanism configured to engage the shoulder so that movement of the steering column in a second direction generally opposing the first direction is restricted, wherein the retainer mechanism moves with the receiver structure and relative to the body during coupled motion of the steering column and the linkage mechanism.

2. The children's ride-on vehicle of claim 1, wherein the distal segment extends at least substantially parallel to the proximal portion.

3. The children's ride-on vehicle of claim 1, wherein the receiver structure is an opening.

4. The children's ride-on vehicle of claim 1, wherein the plurality of wheels includes a plurality of steerable wheels, and further wherein the linkage mechanism includes a spanning member that extends perpendicular to the proximal portion of the steering column and couples to the plurality of steerable wheels, and wherein the spanning member defines the receiver structure.

5. The children's ride-on vehicle of claim 4, wherein the spanning member defines opposing first and second flanking spatial regions adjacent the spanning member, the steering column being configured to be received by the receiver structure from the first region, and wherein the retainer mechanism includes a surface disposed in the first region and configured to engage the steering column if the steering column is urged generally opposite to the first direction.

6. The children's ride-on vehicle of claim 4, wherein the retainer mechanism includes a plurality of retainer elements, and further wherein the plurality of retainer elements includes the spanning member.

7. The children's ride-on vehicle of claim 6, wherein the plurality of retainer elements further includes a cap adapted to be manually coupled to the spanning member over the shoulder to restrict movement of the steering column in the second direction.

8. The children's ride-on vehicle of claim 7, wherein the cap and the spanning member include a plurality of tabs and slots that are respectively adapted to be engaged with each other by inserting the tabs through the slots to couple the cap to the spanning member.

9. The children's ride-on vehicle of claim 1, which further comprises a motorized drive assembly coupled to one or more of the plurality of wheels and adapted to propel the vehicle.

10. The children's ride-on vehicle of claim 1, wherein the retainer mechanism is formed at least substantially of plastic.

11. The children's ride-on vehicle of claim 1, wherein the retainer mechanism includes a pair of retainer elements configured to be assembled manually, without the use of tools.

12. The children's ride-on vehicle of claim 11, wherein the retainer elements include a tab and a slot, and wherein the retainer elements are configured to be assembled by placing the tab in the slot and urging the retainer elements together.

13. The children's ride-on vehicle of claim 12, wherein the retainer elements include a plurality of tabs and at least a corresponding plurality of slots.

14. The children's ride-on vehicle of claim 11, wherein the retainer elements are adapted to produce a visual indication that the retainer elements are assembled properly.

15. The children's ride-on vehicle of claim 11, wherein the retainer elements are adapted to produce an audible indication that the retainer elements are assembled properly.

16. The children's ride-on vehicle of claim 11, wherein the retainer elements are adapted to be snap-fit together.

17. A children's ride-on vehicle, comprising:
a body;
a plurality of wheels mounted rotatably on the body and including at least one steerable wheel; and
a steering assembly coupled to the body and configured to steer the steerable wheel, the steering assembly comprising:
a steering mechanism configured to interface with a child steering the vehicle,
a steering column coupled to the steering mechanism, and
a linkage mechanism that couples movement of the steering column to a change in orientation of the steerable wheel through coupled motion of the steering column and the linkage mechanism, the linkage mechanism including a spanning member and a retainer mechanism, the spanning member extending at least substantially perpendicular to a proximal portion of the steering column and including a receiver structure that receives the steering column from a first direction, the retainer mechanism being configured to be assembled around a shoulder of the steering column extending generally transversely between the proximal portion and a distal segment so that movement of the steering column in a second direction generally opposing the first direction is restricted, wherein the retainer mechanism moves with the receiver structure and relative to the body during coupled motion of the steering column and the linkage mechanism.

18. The children's ride-on vehicle of claim 17, wherein the retainer mechanism includes the spanning member and a retainer element that attaches to the spanning member.

19. The children's ride-on vehicle of claim 18, wherein the spanning member and the retainer element are formed at least substantially of plastic.

20. The children's ride-on vehicle of claim 17, wherein the retainer mechanism includes at least two retainer elements configured to be assembled around the spanning member.

21. The children's ride-on vehicle of claim 20, wherein the retainer elements are configured to be assembled manually, without the use of tools.

22. The children's ride-on vehicle of claim 21, wherein the retainer mechanism includes a tab and a slot, the tab including a flange, and wherein the tab is configured to be urged into the slot so that the flange restricts removal of the tab from the slot.

23. The children's ride-on vehicle of claim 18, wherein the receiver structure is an opening.

24. The children's ride-on vehicle of claim 20, wherein the retainer elements are adapted to produce a visual indication that the retainer elements are assembled properly.

25. The children's ride-on vehicle of claim 20, wherein the retainer elements are adapted to produce an audible indication that the retainer elements are assembled properly.

26. The children's ride-on vehicle of claim 20, wherein the retainer elements are adapted to be snap-fit together.

27. The children's ride-on vehicle of claim 20, wherein the retainer elements include a plurality of tabs and at least a corresponding plurality of slots.

28. A children's ride-on vehicle, comprising:
a body;
a plurality of wheels mounted rotatably on the body and including at least one steerable wheel; and
a steering assembly coupled to the body and configured to steer the steerable wheel, the steering assembly comprising:
a steering mechanism configured to interface with a child steering the vehicle,
a steering column coupled to the steering mechanism and defining a proximal portion, a distal segment, and a shoulder extending between the proximal portion and the distal segment, and
a linkage mechanism that couples movement of the steering column to a change in orientation of the steerable wheel through coupled motion of the steering column and the linkage mechanism, the linkage mechanism including a spanning member and a retainer mechanism, the spanning member extending at least substantially perpendicular to the proximal portion of the steering column and defining opposing first and second flanking regions adjacent the spanning member and also defining a receiver structure configured to receive the distal segment of the steering column in a direction from the first flanking region, the retainer mechanism having a surface disposed in the first flanking region and configured to engage the shoulder if the steering column is pulled generally opposite to the direction, wherein the retainer mechanism moves with the receiver structure and relative to the body during coupled motion of the steering column and the linkage mechanism.

29. The children's ride-on vehicle of claim 28, wherein the first flanking region is generally upward from the spanning member.

30. The children's ride-on vehicle of claim 28, wherein the retainer mechanism includes a plurality of retainer elements, and wherein the retainer mechanism is configured to be assembled by urging the retainer elements together translationally.

31. The children's ride-on vehicle of claim 28, wherein the distal segment defines a distal end of the steering column, and wherein the distal end is exposed when the retainer mechanism is assembled.

32. The children's ride-on vehicle of claim 28, wherein the surface of the retainer mechanism is configured to engage the shoulder only when the steering mechanism is urged generally opposite to the direction.

* * * * *